(12) United States Patent
Qin

(10) Patent No.: US 6,330,484 B1
(45) Date of Patent: Dec. 11, 2001

(54) METHOD AND APPARATUS FOR FUZZY LOGIC CONTROL WITH AUTOMATIC TUNING

(75) Inventor: S. Joe Qin, Austin, TX (US)

(73) Assignee: Fisher-Rosemount Systems, Inc., Austin, TX (US)

( * ) Notice: Subject to any disclaimer, the term of this patent is extended or adjusted under 35 U.S.C. 154(b) by 0 days.

(21) Appl. No.: 08/105,899

(22) Filed: Aug. 11, 1993

(51) Int. Cl.[7] .................................................. G05B 13/02
(52) U.S. Cl. .............................. 700/50; 700/30; 700/37; 700/38; 700/42; 706/900
(58) Field of Search ........................... 700/28, 31, 37, 700/42, 50, 38, 41, 52; 706/1, 3–5, 52, 900, 906

(56) References Cited

U.S. PATENT DOCUMENTS

| | | | |
|---|---|---|---|
| 3,798,426 | 3/1974 | Bristol, II | 235/151.1 |
| 4,441,151 | 4/1984 | Hayashibe | 364/157 |
| 4,481,567 | 11/1984 | Kaya et al. | 364/157 |
| 4,549,123 | 10/1985 | Hägglund et al. | 318/610 |
| 4,602,326 | 7/1986 | Kraus | 364/158 |
| 4,754,391 | 6/1988 | Suzuki | 364/157 |
| 4,758,943 | 7/1988 | Aström et al. | 364/157 |
| 4,768,143 | 8/1988 | Lane et al. | 364/157 |
| 4,814,968 | 3/1989 | Fukumoto | 364/150 |
| 4,855,674 | 8/1989 | Murate et al. | 324/158 R |
| 4,882,526 | 11/1989 | Iino et al. | 318/561 |
| 4,954,975 | 9/1990 | Kalata | 364/567 |
| 4,959,767 | 9/1990 | Buchner et al. | 364/151 |
| 5,057,993 | 10/1991 | Kanda | 364/162 |
| 5,179,634 * | 1/1993 | Matsunaga et al. | 395/75 |
| 5,231,335 * | 7/1993 | Mega et al. | 318/85 |
| 5,241,651 * | 8/1993 | Ueda | 395/61 |
| 5,295,061 * | 3/1994 | Katayama et al. | 395/900 |

FOREIGN PATENT DOCUMENTS

| | | |
|---|---|---|
| 0 241 286 A1 | 10/1987 | (EP) . |
| 2 211 324 | 6/1989 | (GB) . |
| A 2 211 324 | 6/1989 | (GB) . |

OTHER PUBLICATIONS

Zheng, J et al; "STFC—Self–Tuning Fuzzy Controller"; IEEE, 1992; New York.*
Takahashi et al, H; "Automatic Speed Control Device Using Self Tuning Fuzzy Logic,"; IEEE; 1988; New York.*
David G. Burkhardt and Piero P. Bonissone, "Automated Fuzzy Knowledge Base Generation and Tuning," IEEE International Conference on Fuzzy Systems, pp. 179–188, Mar. 8–12, 1992.
Chen et al., "A Self–Learning Fuzzy Controller," IEEE International Conference on Fuzzy Systems, pp. 189–196, Mar. 8–12, 1992.
Daugherity et al., "Performance Evaluation of a Self–Tuning Fuzzy Controller," IEEE International Conference on Fuzzy Systems, pp. 389–397, Mar. 8–12, 1992.
Hoon Kang and George Vachtsevanos, "Adaptive Fuzzy Logic Control," IEEE International Conference on Fuzzy Systems, pp. 407–414, Mar. 8–12, 1992.

(List continued on next page.)

Primary Examiner—William Grant
Assistant Examiner—Steven R. Garland
(74) Attorney, Agent, or Firm—Fulbright & Jaworski

(57) ABSTRACT

A system and method for automatically tuning a fuzzy logic process controller is presented. A process under control is automatically assessed to determined process control characteristics including, for example, ultimate gain, ultimate period and time delay. Then, these quantities are used to calculate tunable control parameters which include scaling factors, which are applied to the fuzzy logic controller in order to optimize the performance of the fuzzy logic controller when connected to control the process.

12 Claims, 8 Drawing Sheets

OTHER PUBLICATIONS

A. Boscolo, "Computer Aided Tuning and Validation of Fuzzy Systems," IEEE International Conference on Fuzzy Systems, pp. 605–614, Mar. 8–12, 1992.

Samuel M. Smith and David J. Comer, "An Algorithm for Automated Fuzzy Logi Controller Tuning," IEEE International Conference on Fuzzy Systems, pp. 615–622, Mar. 8–12, 1992.

Tseng et al., "Fuzzy Servocontroller: The Hierarchical Approach," IEEE International Conference on Fuzzy Systems, pp. 623–631, Mar. 8–13, 1992.

Li Zheng, "A Practical Guide to Tune of Proportional and Integra(PI) Like Fuzzy Controllers," IEEE International Conference on Fuzzy Systems, pp. 633–640, Mar. 8–13, 1992.

M. Mizumoto, "Realization of PID Controls by Fuzzy Control Methods," IEEE International Conference on Fuzzy Systems, pp. 709–715, Mar. 8–12, 1992.

Seborg et al., *Process Dynamics and Control*, Chapters 12, 13 and 18, John Wiley & Sons, Inc., 1989, U.S.A.

Hong et al., "A Design of Auto–Tuning PID Controller Using Fuzzy Logic," *1992 International Conference on Industrial Electronics, Control, Instrumentation and Automation*, vol. 2, pp. 971–976 (Nov. 9, 1992).

Hed et al., "Fuzzy Self–Tuning of PID Controllers," *Fuzzy Sets and Systems*, vol. 56, No. 1, pp. 37–46 (May 25, 1993).

Daugherity et al., "Performance Evaluation of a Self–Tuning Fuzzy Controller," *IEEE International Conference on Fuzzy Systems*, pp. 389–397 (Mar. 8, 1992).

Ying et al., "Fuzzy Control Theory: A Nonlinear Case*," *Automatica*, vol. 26, No. 3, pp. 513–520, 1990.

Jyh–Shing R. Jang, "Self–Learning Fuzzy Controllers Based on Temporal Back Propagation," *IEEE Transactions on Neural Networks*, vol. 3, No. 5, Sep. 1992.

Cheng Ling and Thomas F. Edgar, "The Tuning of Fuzzy Heuristic Controllers," 1992 AIChE Conference Miami Beach, Florida, Nov. 4, 1992.

A. Kaya and T.J. Scheib, "Tuning of PID Controls of Different Structures," *Control Engineering*, pp. 62–66, 1988.

* cited by examiner

|   | Δe* |   |
|---|---|---|
| e* | NL | PL |
| NL | PL | ZO |
| PL | ZO | NL |

FIG. 8A

|   | Δe* |   |   |   |
|---|---|---|---|---|
| e* | NL | NS | PS | PL |
| NL | PL | PL | PS | ZO |
| NS | PL | PS | ZO | NS |
| PS | PS | ZO | NS | NL |
| PL | ZO | NS | NL | NL |

FIG. 8B

|   | IAE | | |
|---|---|---|---|
|   | PI | FLC | % Improvement |
| Normal (Fig.10C) | 23.0 | 16.5 | 28.3 |
| Noisey (Fig.10D) | 25.6 | 18.6 | 27.3 |

FIG. 11

METHOD AND APPARATUS FOR FUZZY LOGIC CONTROL WITH AUTOMATIC TUNING

BACKGROUND OF THE INVENTION

Fuzzy logic control (FLC) has been widely applied to the industrial environment in recent years. Although many of the applications are relatively small in scale, such as in washing machines, elevators, automobiles and video cameras, there is a considerable amount of interest in applying fuzzy logic systems to process control. In the field of process control, research has been conducted into the use of FLCs similar to conventional Proportional, Integral, Derivative (PID) controllers.

In typical applications, an operator will set up a FLC by adjusting certain control parameters that exist within the controller, in order to attempt to optimize the response performance of the controller. While manual tuning of fuzzy logic controllers is possible, it is often tedious and error prone. Moreover, the process under control may change over time, thus requiring retuning.

Automatic tuning approaches have been applied to process controllers and their variants. For example, in U.S. Pat. No. 4,549,123, and in application Ser. No. 08/070,090, now U.S. Pat. No. 5,453,925, filed May 28, 1993 (assigned to the same assignee as the present application), the disclosures of each of which are incorporated herein by reference, a controlled induced oscillation procedure is used in order to determine the ultimate gain, ultimate period and time delay of the process under control. Once these process characteristics are derived, tuning rules are used to determine the process control parameters of the PID controller.

However, to date, there have been no methods or means proposed for the automatic tuning of fuzzy logic controllers, thus leaving an operator with only trial and error manual tuning.

SUMMARY OF THE INVENTION

The present invention provides a method and apparatus for fuzzy logic control which incorporates automatic self-tuning, thus satisfying the above-noted discrepancies in prior approaches.

In general, the present invention contemplates an automatically tunable fuzzy logic controller. The dynamic characteristics of the process under control are determined and are used to calculate process control parameters for application to the fuzzy logic controller to control the process.

In one embodiment a fuzzy logic controller is employed for controlling a process by selectively connecting the output of the fuzzy logic controller to the process under control. The fuzzy logic controller is tuned by disconnecting the fuzzy logic controller from the process, and by applying to the process a controllable signal generator which causes the process to undergo controlled induced oscillation. During induced oscillation, the output of the process is monitored by a tuning module and dynamic characteristics of the process are determined. These dynamic characteristics are then used by the tuning module to calculate control parameters within the fuzzy logic controller in order to optimally tune the fuzzy logic controller to control the process under consideration. The signal generator is then disconnected, and the tuned fuzzy logic controller is then reconnected in order to control the process.

In accordance with another embodiment of the present invention, a fuzzy logic controller which is employed for process control is tuned by injecting a perturbation signal into the closed loop including the fuzzy logic controller and process to cause the process to undergo controlled induced oscillation. Then, during induced oscillation, the process is monitored by a tuning module and dynamic characteristics of the process are determined. These characteristics are then used to calculate control parameters within the fuzzy logic controller in order to optimally tune the fuzzy logic controller to control the process under consideration. After tuning, the perturbation signal is removed, and the tuned fuzzy logic controller then controls the process in a closed-loop fashion.

In accordance with yet another embodiment of the present invention, a fuzzy logic controller is tuned by a tuning module by determining the dynamic process characteristics using a pattern recognition tuning method which analyzes the response of the process to process upset conditions, and from the response calculates dynamic process characteristics. Then, from these dynamic process characteristics, control parameters for the fuzzy logic controller are determined in order to optimally tune the fuzzy logic controller to control the process. In the alternative, the tuning module may employ a model matching tuning method to determine dynamic process characteristics.

The dynamic process characteristics determined during the tuning procedure may include, for example, the ultimate gain, ultimate period and time delay of the process. The control parameters which are determined from the dynamic process characteristics may include, for example, a control error scaling factor, a change in control error scaling factor and a control action scaling factor.

BRIEF DESCRIPTION OF THE DRAWINGS

FIGS. 8A and B are tabular representations of exemplary fuzzy logic controller rules used in the present invention.

FIG. 11 is a table illustrating the comparative performance of the fuzzy logic controller of the present invention.

DETAILED DESCRIPTION

Figure 1:
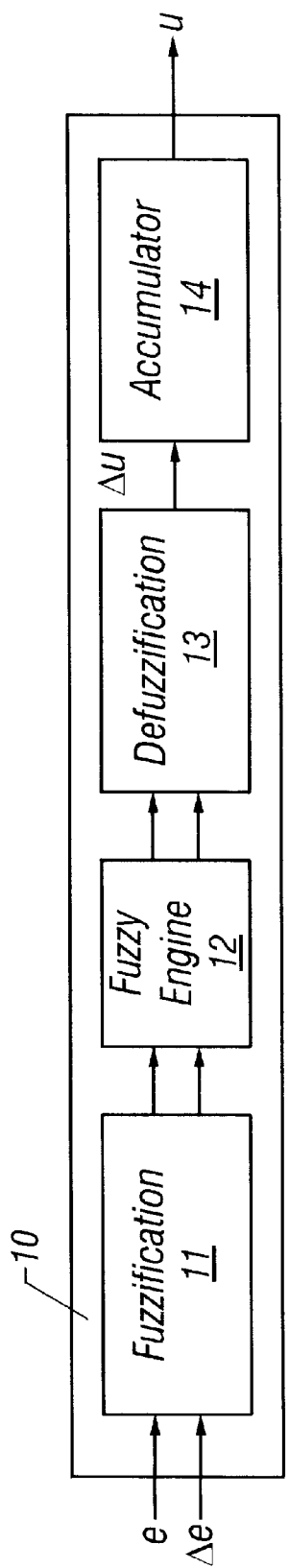
FIG. 1 is a block diagram of a fuzzy logic controller.

A fuzzy logic controller (FLC) 10 used in the present invention is composed of three basic parts, illustrated in FIG. 1. Referring to FIG. 1, input signal fuzzification block 11 transforms the continuous input signal or signals into linguistic fuzzy variables such as, for example, Small, Medium and Large by use of so-called membership functions (described in more detail below). Typical continuous input signals are shown in FIG. 1, and are an error signal, e, and a change in the error signal, $\Delta e$, since the last sample taken of the error signal. Other continuous input variables may also be applied as input signals to fuzzification block 11. In accordance with the present invention, FLC 10 may be any type of fuzzy logic controller including, for example, Zadeh fuzzy logic controllers and Lukasiewicz fuzzy logic controllers.

The fuzzy engine block 12 carries out rule inference, and allows human experience to be injected as linguistic rules. Defuzzification block 13 converts the inferred control action produced by fuzzy engine block 12 back into a continuous signal that interpolates between simultaneously satisfied rules, as determined by fuzzy engine block 12. Owing to the action of defuzzification block 13, fuzzy logic is sometimes referred to as continuous logic or interpolative reasoning. Fuzzy engine block 12 and defuzzification block 13 are described in more detail below.

Two distinct features of FLC 10 are that human experience can be integrated and that fuzzy logic provides a non-linear relationship induced by the membership functions of the fuzzification block 11, the rules of the fuzzy engine block 12, and the interpolation of the defuzzification block 13. These features make fuzzy logic promising for process control where conventional control technologies do a poor job, and where operator experience exists.

FLC 10 also includes an accumulator 14 which functions to accumulate the changes in control action, $\Delta u$, which occur over time, in order to produce the control action, u. In other words, since the FLC operates in a sampled data mode, the control action, u, is calculated for any point in time as the control action for the previous sampling time, added to the change in control action. In other words, $u(t+\Delta t)=u(t)+\Delta u$, where $\Delta t$ is the sampling interval.

Figure 2:
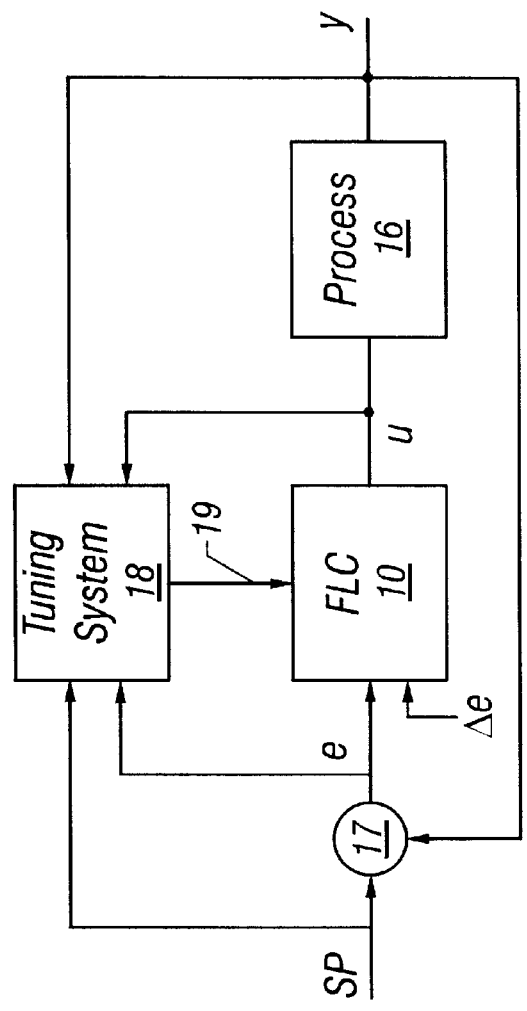
FIG. 2 is a block diagram of an automatically tunable fuzzy logic controller connected to a process in a closed loop process controlled system, in accordance with the present invention.

Referring now to FIG. 2, presented is a block diagram of an automatically tunable fuzzy logic process controller system, in accordance with the present invention. Process 16 may be any type of process which is desired to be controlled. In operation, an output signal or a process variable, y, is sensed from process 16 and applied to summing block 17 for comparison against a set point, sp. The difference between process variable, y, and set point sp, is an error signal, e, which is supplied to FLC 14, along with the change in control error, $\Delta e$. The change in control error, $\Delta e$, is equal to the difference between the current control error, and the control error from the previous sampling interval. In other words, $\Delta e=e(t)-e(t-\Delta t)$. In closed-loop operation, the control action, u, produced by FLC 10 is applied to process 16. In this matter, FLC 10 operates to drive process variable, y, to be substantially equal to set point, sp.

Also provided in accordance with the present invention is tuning system 18 which senses various measurable quantities existing within the fuzzy logic controller system, in order to determine the dynamic process characteristics of process 16. As shown in FIG. 2, the quantities that may be measured by tuning system 18 include, for example, process variable, y, set point, sp, error signal, e, and the control action, u. However, it will be understood that measurable quantities within the fuzzy logic controller system other than those illustrated in FIG. 2 may be measured by tuning system 18 in order to determine the dynamic process characteristics of process 16.

In accordance with the present invention, once the dynamic process characteristics are determined by tuning system 18, tuning system 18 calculates appropriate control parameters for FLC 10, which are forwarded to FLC 10 through line 19. Then, process 16 is thereafter controlled in a closed-loop fashion by the newly tuned FLC 10, until such time as retuning is desired or required.

Figure 3:
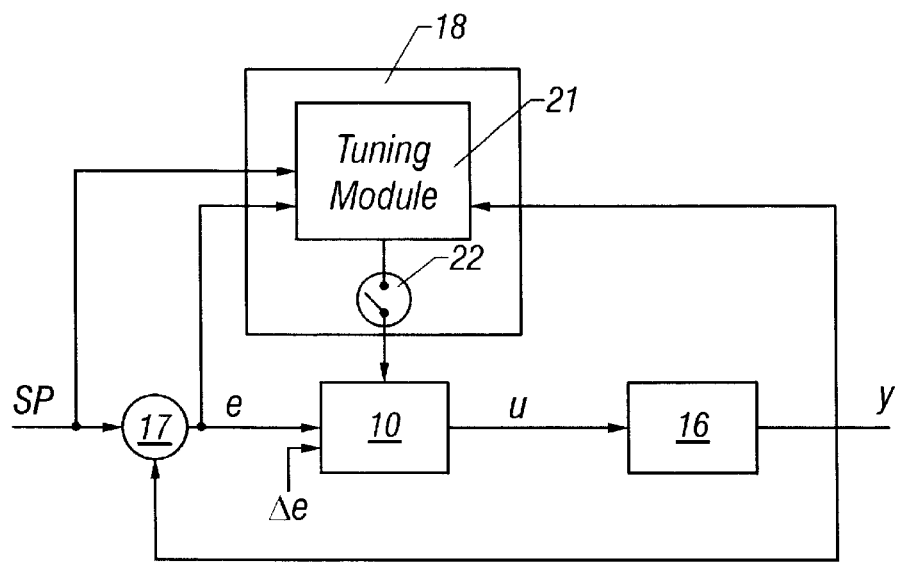
FIG. 3 is a block diagram of an exemplary embodiment of an automatically tunable fuzzy logic controller for controlling a process, in accordance with the present invention.

Referring now to FIG. 3, presented is a block diagram of a specific embodiment of a tuning system 18 for automatically tuning fuzzy logic controller 10, in accordance with the present invention. In the embodiment of FIG. 3, tuning system 18 is shown composed of tuning module 21 and switch 22. In this embodiment, tuning module 21 functions to determine the dynamic characteristics of process 16.

This may be accomplished through a model matching tuning method, in which signature analysis is performed on process variable, y, in order to select from a plurality of stored mathematical models, the model that most accurately characterizes process 16. Then, once the dynamic characteristics of process 16 are determined from the selected model, the control parameters for FLC 10 are calculated and are transferred to FLC 10 from tuning module 21, by activation of switch 22. The model matching tuning method is known to those of skill in this technology.

Tuning Module 21 in FIG. 3 may also operate to determine the dynamic process characteristics of process 16 using a pattern recognition method of process characterization, such as that presented in U.S. Pat. No. 4,602,326, the disclosure of which is expressly incorporated herein by reference. In the pattern recognition method of tuning, the characteristics of process 16 are determined by observing process variable, y, as it responds to a process upset condition. The pattern of process variable, y, produced as a result of the process upset is then analyzed to determine the dynamic characteristics of process 16. Then, in accordance with the present invention, the control parameters for FLC 10 are calculated from the determined process characteristics, and these control parameters are transferred from tuning module 21 to FLC 10 through controllable switch 22.

Figure 4:
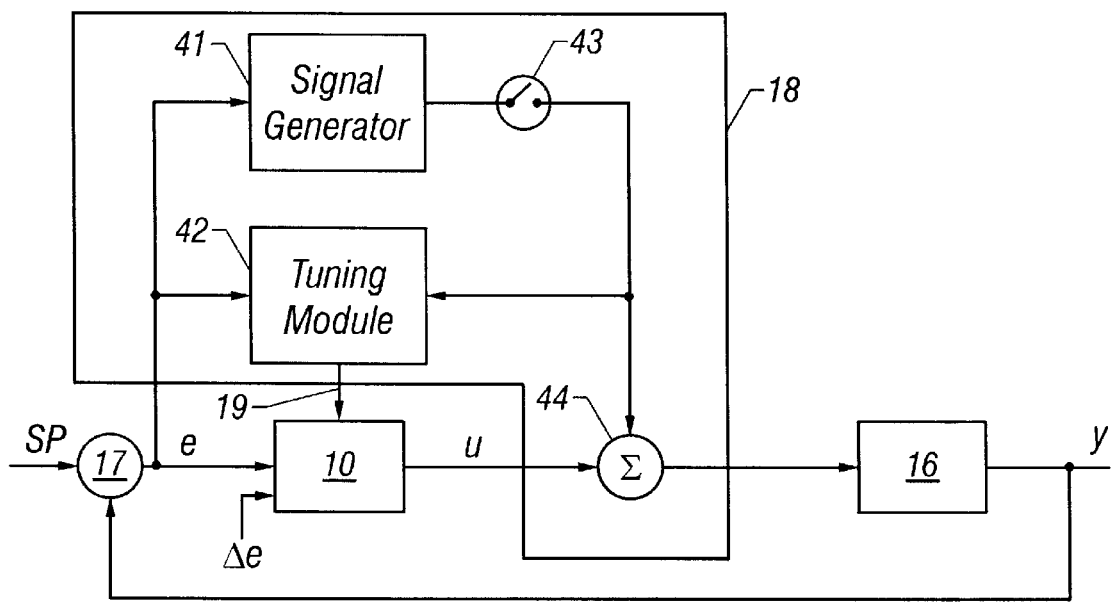
FIG. 4 is a block diagram of another embodiment of an automatically tunable fuzzy logic controller for controlling a process, in accordance with the present invention.

Referring now to FIG. 4, presented is a block diagram of another embodiment of an automatically tunable fuzzy logic process controller, in accordance with the present invention. In the embodiment of FIG. 4, tuning system 18 includes a controllable signal generator 41, tuning module 42, controllable switch 43 and summing block 44. This embodiment operates to determine the dynamic characteristics of process 16 by injecting an excitation signal, produced by controllable signal generator 41, into the closed loop of process 16, summing block 17 and FLC 10. This is accomplished by closing switch 43, thus adding the excitation signal produced by controllable signal generator 41 to the control action, u, produced by FLC 10. The injection of the excitation signal causes the loop to oscillate in a controlled manner, and during this controlled induced oscillation, tuning module 42 determines the dynamic characteristics of process 16. From these dynamic characteristics, control parameters for FLC 10 are calculated by tuning module 42, and are transferred to FLC 10 through line 19. After tuning is completed, switch 43 is opened and process 16 is thereafter controlled in a closed-loop fashion by tuned FLC 10.

Such a signal injection method of determining the characteristics of process 16 is disclosed, for example, in application Ser. No. 07/753,271, now U.S. Pat. No. 5,283,729 (assigned to the same assignee as the present application), the disclosure of which is expressly incorporated herein by reference.

Figure 5:
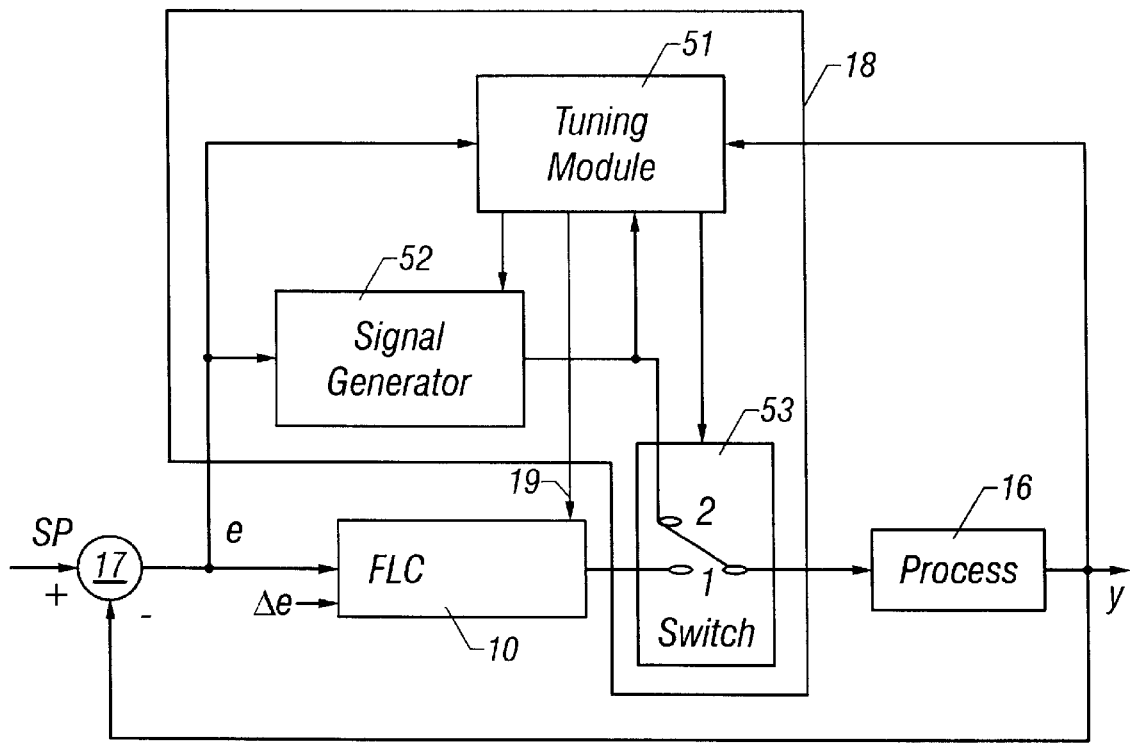
FIG. 5 is a block diagram of yet another embodiment of an automatically tunable fuzzy logic controller system for controlling a process, in accordance with the present invention.

Referring now to FIG. 5, presented is a block diagram of yet another embodiment of an automatically tunable fuzzy logic process control system, in accordance with the present invention. In the embodiment of FIG. 5, tuning system 18 includes tuning module 51, controllable signal generator 52 and controllable switch 53. In operation, tuning module 51, either automatically or under operator control, places switch 53 in position 2, which substitutes the output of controllable signal generator 18 for the control action, u, produced by FLC 10. Tuning module 51 then controls the operation of controllable signal generator 52 by monitoring process variable, y, error signal, e, and the output of controllable signal generator 18, to perform controlled induced oscillation tuning of FLC 10.

After completion of the induced oscillation tuning procedure, tuning module 51 returns switch 53 to position 1, and calculates dynamic process characteristics for process 16. Then, from these dynamic process characteristics, tuning module 51 calculates control parameters and applies them to FLC 10 through line 19. Then, process 16 is thereafter controlled in a closed-loop fashion by tuned FLC 10, until such time as retuning is desired or required.

As mentioned earlier, U.S. Pat. No. 4,549,123 and application Ser. No. 08/070,090, now U.S. Pat. No. 5,453,925, filed May 28, 1993, each present controlled induced oscillation procedures which may be used to determine the dynamic process characteristics of process 16.

It should be noted that any of the elements appearing in FIGS. 1–5 may be embodied in hardware, or may be implemented in an appropriately programmed digital computer which is programmed with software either as separate programs or as modules of a common program.

Figure 6A:
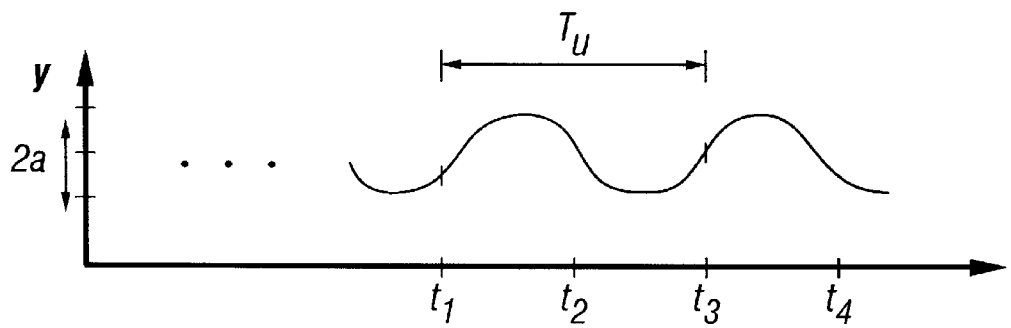
FIGS. 6A and B are graphs of a process input and process output signal during controlled induced oscillation tuning of the fuzzy logic controller, in accordance with the present invention.
Figure 6B:
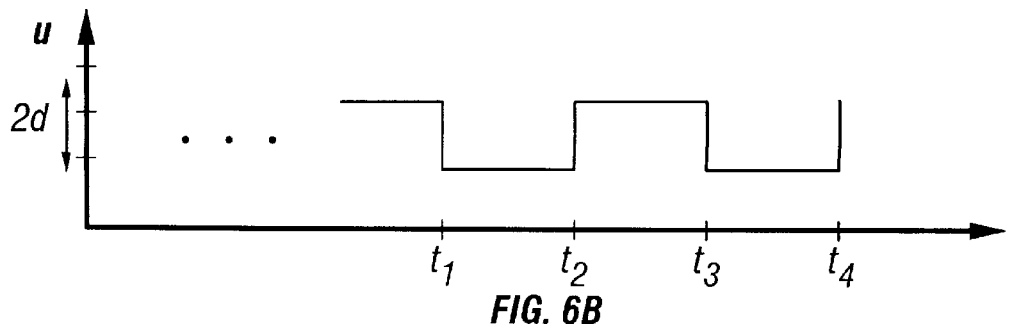

Referring now to FIGS. 6A and 6B, graphically illustrated is a portion of an exemplary induced oscillation tuning procedure, which may be used to automatically tune a FLC, in accordance with one embodiment of the present invention. It should be understood that other types of automatic tuning procedures may also be used, such as, for example, model matching pattern recognition or signal injection, and the discussion of controlled induced oscillation should be considered merely exemplary of the present invention.

Referring to FIG. 6A, depicted is the output, y, of process 16, and depicted in FIG. 6B is the input, u, of process 16, when switch 53 (FIG. 5) is placed in position 2 and is connected to the output of signal generator 52. To induce controlled induced oscillation, signal generator 52 applies a square wave signal having a selectable peak to peak value of 2d, centered about the value of the control signal, u, before induced oscillation was initiated. As can be seen in FIG. 6A, process output, y, will exhibit an oscillation having a peak to peak value of 2a, and a period of $T_u$. This period is also known as the ultimate period of process 16.

Then, using known tuning methods including Internal Model Control (IMC) tuning, Cohen and Coon tuning, Ziegler-Nichols tuning, or modified Ziegler-Nichols tuning, to name a few, the selected tuning procedure is used to calculate, from the quantities d, a, and $T_u$, derived from the induced oscillation illustrated in FIGS. 6A and 6B, dynamic process characteristics including proportional gain $K_c$ and integral time constant $T_i$, which are tunable parameters used to control a Proportional Integral (PI) controller. Then, these automatically derived dynamic process characteristics $K_c$ and $T_i$ are used, as explained in more detail below, to calculate parameters which are used to tune FLC 10.

In order better to explain the tuning of the FLC in accordance with the present invention, a brief discussion of FLCs may be beneficial.

Referring again to FIG. 1, the functional relationship represented by FLC 10 may be described as follows:

$$\Delta u = FLC(\Delta e, e) \tag{1}$$

where FLC(•) represents the non-linear relationship of the FLC, $\Delta u$ represents the change in control action, e is the control error and $\Delta e$ is the change in control error. Since the FLC operates in a sampled data mode, the control action, u, is calculated for any point in time as the control action for the previous sampling time, added to the change in control action. In other words, $u(t+\Delta t)=u(t)+\Delta u$, where $\Delta t$ is the sampling interval. The control error, e, for any sampling period is equal to the difference between the set-point, sp, and the measured variable, y. The change in control error, $\Delta e$, is equal to the difference between the current control error, and the control error from the previous sampling interval. In other words, $\Delta e = e(t) - e(t-\Delta t)$.

Fuzzy membership functions used in fuzzification block 11 may be defined based on prior knowledge about the process. To illustrate how to define the membership functions for the control error, e, change of control error, $\Delta e$, and change in control action, $\Delta u$, it is convenient to use the scaled variables:

$$e^* = \frac{e}{S_e} \tag{2}$$

$$\Delta e^* = \frac{\Delta e}{S_{\Delta e}} \tag{3}$$

$$\Delta u^* = \frac{\Delta u}{S_{\Delta u}} \tag{4}$$

where $S_e$, $S_{\Delta e}$ and $S_{\Delta u}$ are scaling factors for e, $\Delta e$ and $\Delta u$, respectively. $e^*$, $\Delta e^*$ and $\Delta u^*$ are scaled so that they each have values that are greater than or equal to -1, and less than or equal to 1. Possible sets of fuzzy membership functions for $e^*$, $\Delta e^*$ and $\Delta u^*$ are given in FIGS. 7A, B, C, and D. The number of membership functions for each variable can vary, depending on the resolution required for that variable. Generally speaking, more membership functions offer more digress of freedom to the functional relationship of the controller.

As discussed by Ying et al., "Fuzzy Control Theory: A Non-Linear Case," *Automatica*, 26(3) pp. 513–520 (1990), a conventional PID controller can be reproduced using a FLC with two membership functions for each input variable $e^*$ and $\Delta e^*$ and with linear defuzzification.

Figure 7A:
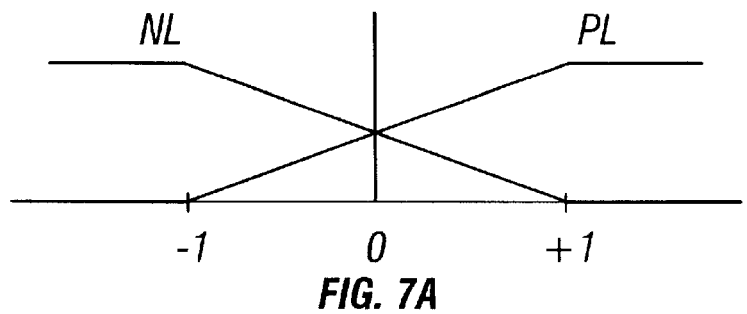
FIGS. 7A, B, C and D illustrate exemplary membership functions, used in the fuzzy logic controller of the present invention.
Figure 7B:
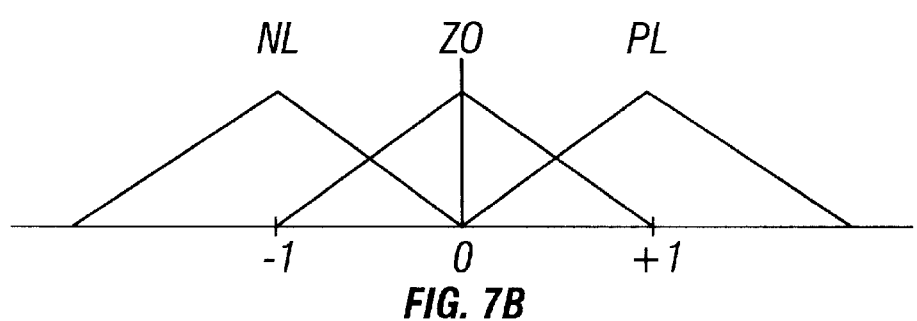

FIG. 7A illustrates two membership functions, which may be used for input variables, $e^*$ and $\Delta e^*$, and FIG. 7B illustrates three membership functions, used for change in control action, $\Delta u^*$ when control error, $e^*$, and control error change, $\Delta e^*$, are conditioned using two membership functions shown in FIG. 7A.

Figure 7C:
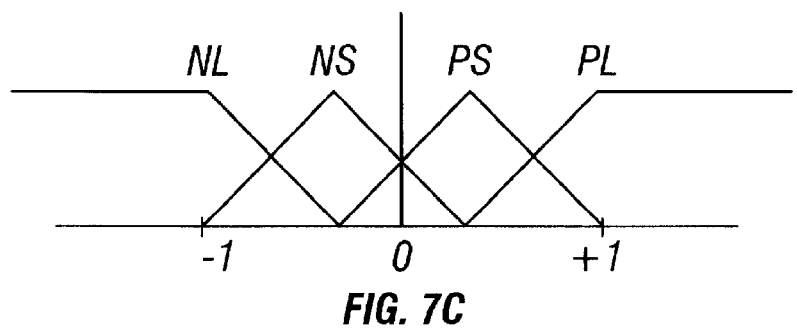
Figure 7D:
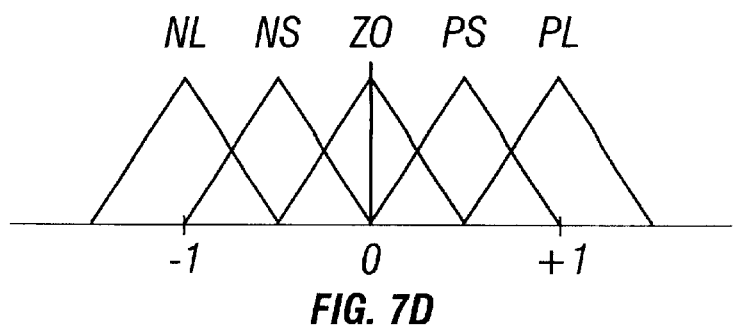

Similarly, FIG. 7D shows five membership functions used for change in control action, $\Delta u^*$, when control error, $e^*$, and change in control error, Δe*, are conditioned using the four membership functions illustrated in FIG. 7C. In each of FIGS. 7A, B, C, and D, the membership partitions are symmetric from −1 to 1, and the following adjectives are used to describe the various membership functions:

| | |
|---|---|
| NL- | Negative large |
| NS- | Negative small |
| ZO- | Zero |
| PS- | Positive small |
| PL- | Positive large |

As mentioned above, fuzzy engine block 12 operates to apply inference rules to the operation of the membership functions of fuzzification block 11. In general, the inference rule for a FLC can be described as follows:

$$\{\text{If } e^* \text{ is } A_i \text{ and } \Delta e^* \text{ is } B_i, \text{ then make } \Delta u^* \; C_i\}. \tag{5}$$

where $A_i$, $B_i$, and $C_i$ are adjectives for $e^*$, $\Delta e^*$ and $\Delta u^*$, respectively. These adjectives are the descriptors mentioned above with reference to FIGS. 7A–D (negative large, negative small, zero, and so forth). A fundamental requirement of these rules is that they perform negative feedback control for the sake of stability. An exemplary set of four rules is illustrated in tabular form in FIG. 8A, and an exemplary set of sixteen rules is shown in FIG. 8B. Four rules are used when each of e* and Δe* are conditioned by two membership functions (FIG. 7A), and sixteen rules are used when each of e* and Δe* are conditioned by four membership functions (FIG. 7C).

After the rules are applied in order to establish the required change in control action, Δu*, from the membership functions of control error, e*, and change in control error, Δe*, defuzzification of the scaled change in control action, Δu*, is performed by defuzzification block 13. In accordance with the present invention, the known center of gravity method of defuzzification is used, however, other types of defuzzification methods would also be acceptable, such as, for example, center of mass defuzzification, and generalized center of gravity defuzzification.

Defuzzification using the center of gravity method uses either Lukasiewicz logic, or Zadeh logic, or a combination of Lukasiewicz and Zadeh logic. In a preferred embodiment of the present invention, the Zadeh AND function is used, and either the Lukasiewicz OR function or Zadeh OR function is used.

After defuzzification, the scaled change in control action, Δu*, is descaled by multiplication by scaling factor $S_{\Delta u}$ to arrive at descaled change in control action, Δu. Then, as described above, the change in control action, Δu (which may be either positive or negative), is added to the control action applied during the last sampling interval, u(t), to arrive at the control action to be applied for the present sampling interval, u(t+Δt).

In accordance with the present invention, tuning is accomplished within tuning system 18 (see also FIGS. 2–5) by calculating values for the scaling factors $S_e$, $S_{\Delta e}$ and $S_{\Delta u}$, as functions of dynamic process characteristics that are derived from the process under control during an automatic tuning procedure.

In a known manner, from one of the above-mentioned tuning procedures, dynamic process characteristics such as the critical gain, $K_c$, and integral time constant, $T_i$, are determined for the process under consideration. As mentioned above, a controlled induced oscillation procedure calculates proportional gain, $K_c$, and integral time constant, $T_i$, from the measured quantities, a, d, and $T_u$. Once $K_c$ and $T_i$ are determined, the FLC scaling factors, $S_e$, $S_{\Delta e}$, and $S_{\Delta u}$ are related according to the following equations when Lukasiewicz OR logic is used for defuzzification:

$$K_c = \frac{S_{\Delta u}}{S_{\Delta e}4(1-0.5\alpha)} \tag{6}$$

$$T_i = \frac{S_e}{S_{\Delta e}}\Delta t \tag{7}$$

When Zadeh OR logic is used for defuzzification, the following calculations relate $S_{\Delta e}$, $S_e$ and $S_{\Delta u}$:

$$K_c = \frac{S_{\Delta u}}{S_{\Delta e}(3-\alpha)} \tag{8}$$

$$T_i = \frac{S_e}{S_{\Delta e}}\Delta t \tag{9}$$

When controlled induced oscillation is used for self tuning, based on Ziegler-Nichols tuning rules, equations (6) and (8) may be expressed as equations (10) and (11), respectively:

$$S_{\Delta e} = \frac{\pi a S_{\Delta u}}{7.2(1-0.5\alpha)d} \tag{10}$$

$$S_{\Delta e} = \frac{\pi a S_{\Delta U}}{5.4\left(1-\frac{1}{3}\alpha\right)d} \tag{11}$$

In either instance, control error scaling factor, $S_e$, is calculated according to the equation:

$$S_e = \frac{T_u^*}{1.2}S_{\Delta e} \tag{12}$$

In each of equations (6) through (12) the following definitions apply:

$$0 \leq \alpha = Max(|e^*|,|\Delta e^*|) \leq 1.0 \tag{13}$$

$$T_u^* = {T_u}/{\Delta t} \tag{14}$$

and, Δt is the sampling interval, $T_u$, a and d are the measured quantities determined during controlled induced oscillation, described above with reference to FIG. 3. α is a factor that adjusts the stability margin of the FLC.

In practice, in order to calculate control error scaling factor, $S_e$, change in control error scaling factor, $S_{\Delta e}$, and the scaling factor for the control action, $S_{\Delta u}$, one of the three must be determined. In accordance with one embodiment of the present invention, $S_{\Delta u}$ is determined as a function of the maximum responding speed of the actuator that is being controlled by control action, u. Typical actuators include, for example, valves, pumps, and heating elements, each of which inherently are subject to rate limitation. In the case where the rate limitation is never reached, a maximum possible control error, $e_m$ (which is a function of the operation region of the FLC), is determined.

Once the maximum speed of the actuator, $\Delta u_m$, is determined, to tune the FLC, $S_{\Delta u}$, is set equal to $\Delta u_m$, and $S_e$ and $S_{\Delta e}$ are calculated from equations (10) and (12) (or from equations (11) and (12)). If, as a result of the calculations, $S_e$ is determined to be less than or equal to $e_m$, tuning is concluded. If, however, the calculated $S_e$ is greater than $e_m$, then the control error scaling factor, $S_e$, is set equal to $e_m$ and $S_{\Delta e}$ and $S_{\Delta u}$ are calculated from rearranged equations (10) and (12) (or from rearranged equations (11) and (12)), and tuning is completed.

Figure 9A:
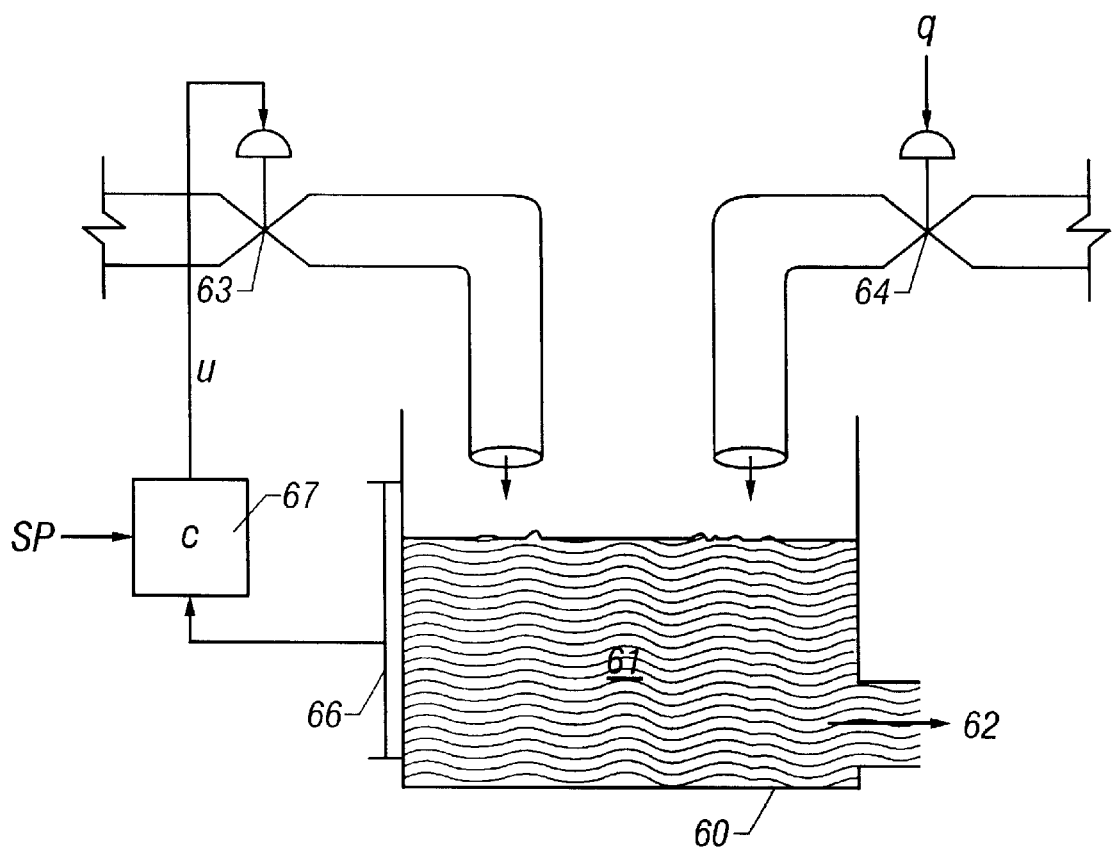
FIGS. 9A and B are an exemplary block diagram and a corresponding mathematical model of a process which is controlled to illustrate the advantages of the present invention.
Figure 9B:
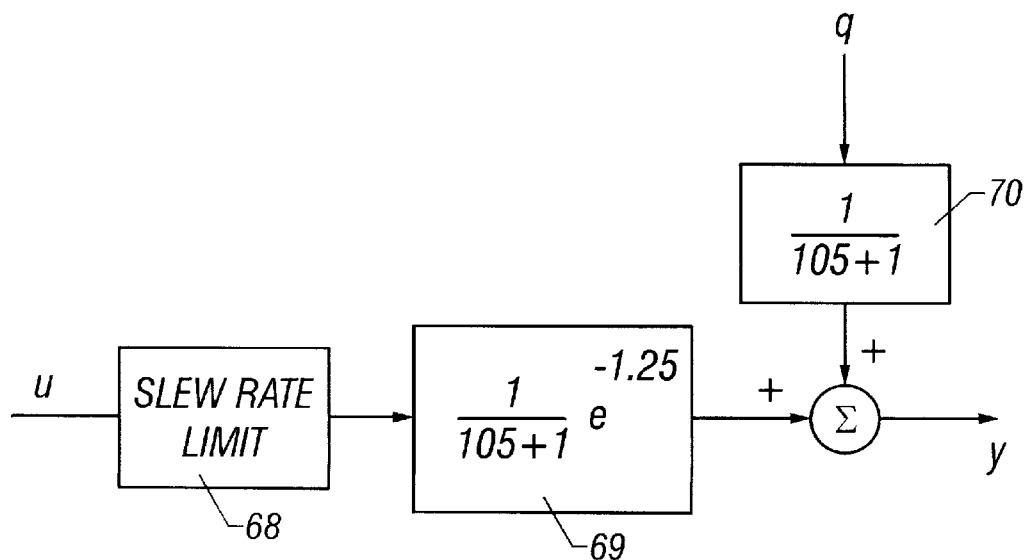

In order to illustrate the advantages of the present invention, some control examples are provided. Referring to FIGS. 9A and 9B, shown are an exemplary block diagram of a process which is controlled in order to illustrate the advantages of the present invention, and a mathematical model of the process. In particular, the process includes a tank 60 which contains liquid 61. Tank 60 includes discharge port 62, from which liquid 61 is discharged at a constant rate. Liquid flows into tank 60 under control of valves 63 and 64. Liquid level detecting device 66 produces a measured variable, y, which is indicative of the level of liquid 61 within tank 60, and controller 67 controls valve 63, as a function of measured variable, y, and set-point, sp, in order to control the level of liquid 61 within tank 60.

Valve 64 is controlled by a load control signal, q, in order to permit assessment of the performance of controller 66 in response to perturbations in the level of liquid 61 within tank 60.

FIG. 9B represents a mathematical model of the process of FIG. 9A. The slew rate of valve 63 is modeled by slew rate limiting block 68, and the contributions to measured variable, y, as a result of control signal, u, and load control signal, q, are modeled respectively by blocks 69 and 70.

Referring now to the graphs of FIGS. 10A–D, presented are graphical examples comparing the tuned FLC of the present invention with a standard PI controller, in response to changes in set point and changes in load. Near the beginning of each graph, the set-point is stepped from 3 to 6 units, and near the middle of each graph, the load control signal is stepped from 0 to 3 units.

Figure 10A:
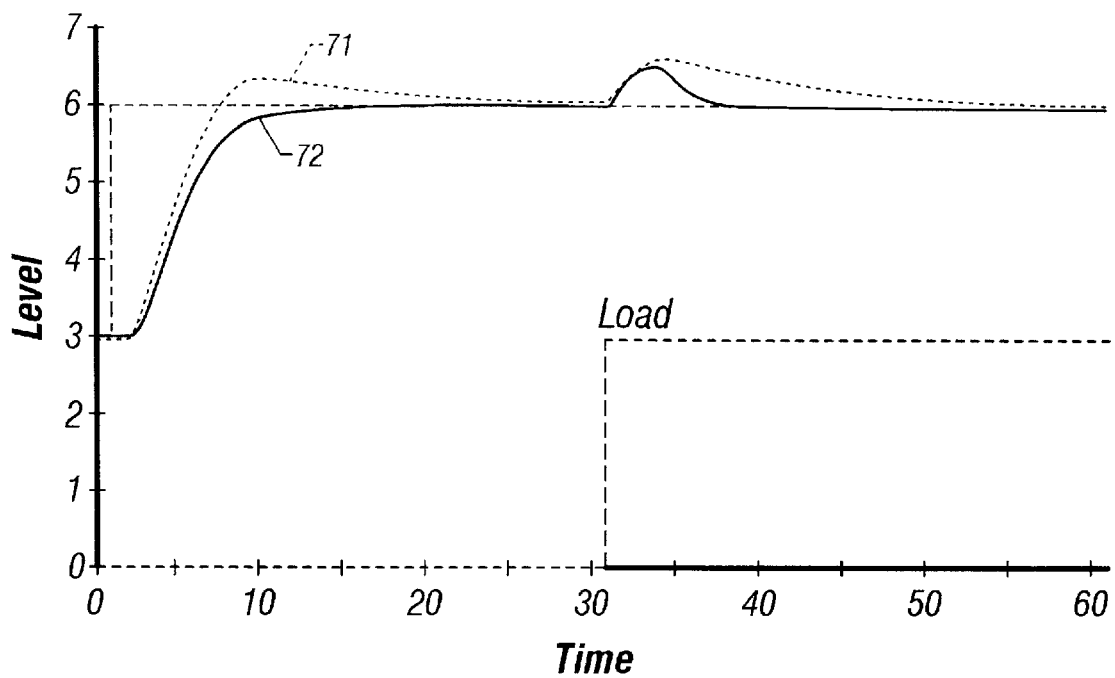
FIGS. 10A, B, C and D are graphs illustrating the comparative performance of the fuzzy logic controller of the present invention, while controlling the process shown in FIG. 9A.

In FIG. 10A, the response of the PI controller, tuned using IMC tuning procedures, is shown by trace 71 and the response of an automatically tuned FLC is shown by trace 72. The tuned parameters for the PI controller used to produce the graph of FIG. 10A were: $T_i=10$, and $K_c=4$; and the tuned parameters for the FLC controller in accordance with the present invention were $S_{\Delta u}=4$, $S_{\Delta e}=0.279$ and $S_e=11.16$.

Figure 10B:
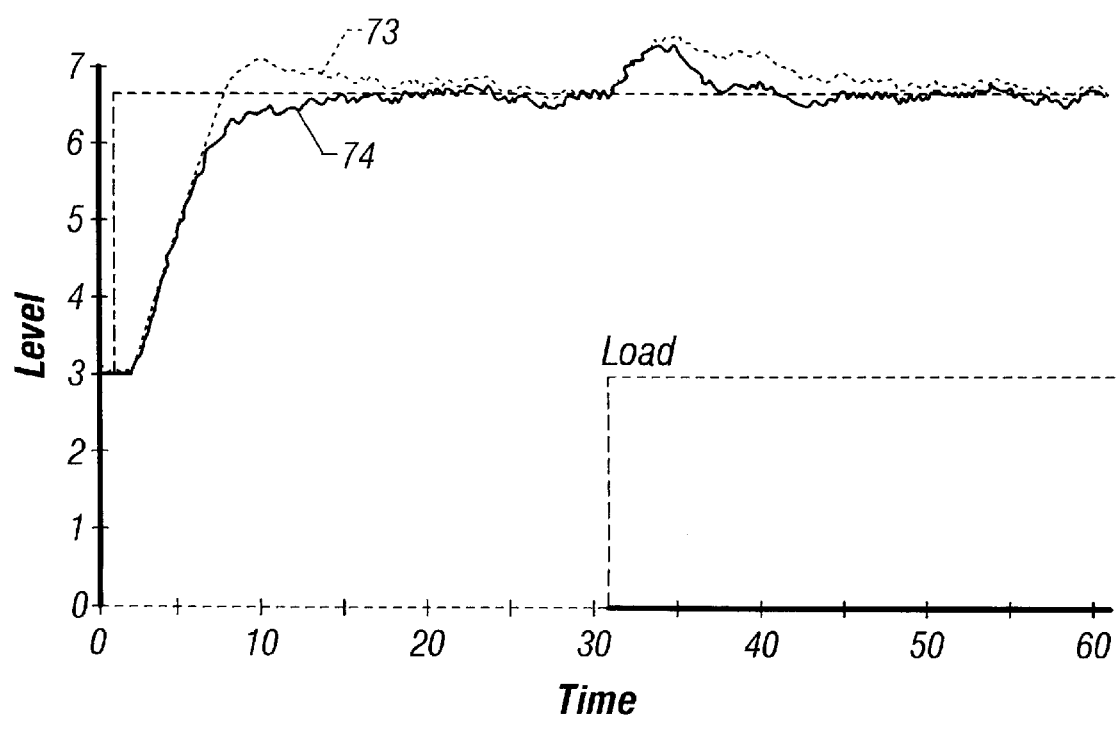

Referring now to FIG. 10B, the same step changes to set point and load were applied as in FIG. 10A, to the same controllers with the same settings, but random noise was introduced into measured variable, y, in order to simulate hydraulic fluctuation of the surface of liquid 61 within tank 60. The response of the tuned PI controller is shown by trace 73, and the response of the tuned FLC controller is shown by trace 74.

Figure 10C:
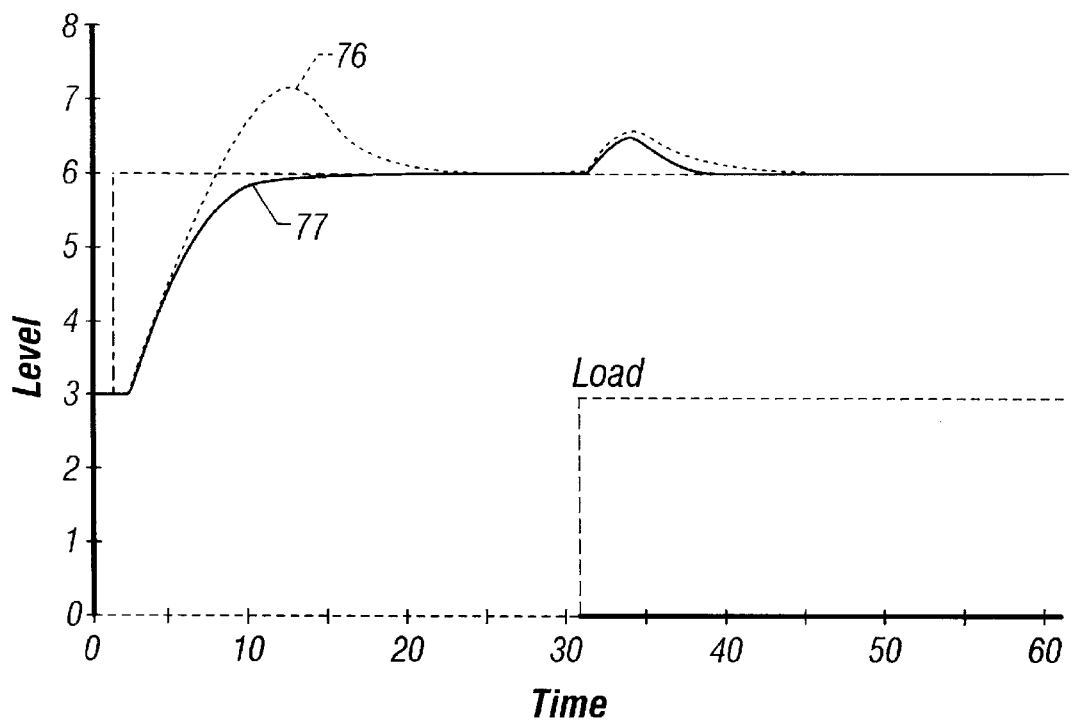

Referring now to FIG. 10C, shown are traces that compare the performance of a tuned PI controller, tuned using the automatic induced oscillation procedure described in application Ser. No. 08/070,090, now U.S. Pat. No. 5,453,925 filed May 28, 1993 (controlled induced oscillation). In FIG. 10C, the tuned parameters used to produce the PI controller trace 76 were: $K_c=3.73$ and $T_i=4.55$, and the tuned parameters used to tune the FLC controller to produce trace 77 were: $S_{\Delta u}=4.0$, $S_{\Delta e}=0.279$, and $S_e=11.16$.

Figure 10D:
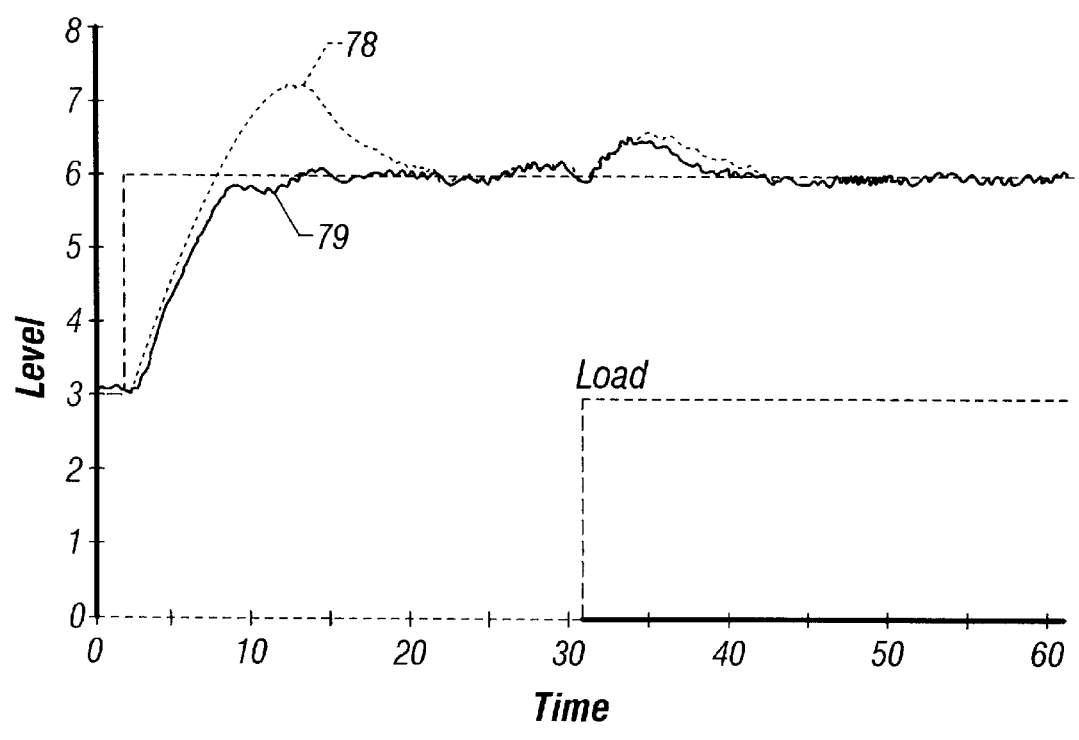

FIG. 10D compares the performance of the same controllers used to produce the traces of FIG. 7C, with the imposition of random noise to simulate hydraulic agitation. Trace 78 is a tuned PI controller and trace 79 is a tuned FLC controller.

As can be seen by comparing the traces of FIGS. 10A–10D, in virtually every instance, the FLC controller which has been tuned in accordance with the present invention, has a substantially better performance than a comparable PI controller. FIG. 11 presents a table showing the calculated Integral Absolute Error (IAE) (a measure of control performance) for the FLC of the present invention and the PI which are plotted together in FIGS. 10C and 10D.

It should be noted that the present invention has been described with reference to specific examples, which are intended to be illustrative and not delimiting of the invention. It will be apparent to those of ordinary skill in this art that changes, additions, or deletions may be made to the disclosed embodiments, without departing from the spirit and scope of the invention.

What is claimed is:

1. A method of automatically tuning a fuzzy logic controller used to control a process in a predetermined manner, said process producing at least one process variable and having at least one control action input connected to said fuzzy logic controller, said method comprising:
   determining from said process a plurality of dynamic process characteristics for tuning a proportional integral derivative controller;
   calculating fuzzy control parameters as functions of said dynamic process characteristics for tuning said fuzzy logic controller; and
   tuning said fuzzy logic controller using said fuzzy control parameters for controlling the process, said determining step comprising:
      causing said process to undergo controlled induced oscillation; and
      determining from said process said plurality of dynamic process characteristics for tuning a proportional integral derivative controller during oscillation of the process.

2. The method of claim 1, said causing step comprising:
   disconnecting said fuzzy logic controller from said at least one control action input; and
   connecting said at least one control input to a controllable signal generator to cause said process to undergo controlled induced oscillation.

3. The method of claim 2, further comprising, reconnecting said fuzzy logic controller to said at least one control action input, after said tuning step.

4. The method of claim 1, said causing step comprising, injecting an excitation signal into a closed loop including said fuzzy logic controller and said process to cause said closed loop to undergo induced oscillation.

5. A method of automatically tuning a fuzzy logic controller used to control a process in a predetermined manner, said process producing at least one process variable and having at least one control action input connected to said fuzzy logic controller, said method comprising:
   determining from said process a plurality of dynamic process characteristics for tuning a proportional integral derivative controller;
   calculating fuzzy control parameters as functions of said dynamic process characteristics for tuning said fuzzy logic controller; and
   tuning said fuzzy logic controller using said fuzzy control parameters for controlling the process, said determining step comprising, determining said plurality of dynamic process characteristics for tuning a proportional integral derivative controller by a model matching method.

6. A method of automatically tuning a fuzzy logic controller used to control a process in a predetermined manner, said process producing at least one process variable and having at least one control action input connected to said fuzzy logic controller, said method comprising:
   determining from said process a plurality of dynamic process characteristics for tuning a proportional integral derivative controller;

calculating fuzzy control parameters as functions of said dynamic process characteristics for tuning said fuzzy logic controller; and tuning said fuzzy logic controller using said fuzzy control parameters for controlling the process, said fuzzy control parameters including scaling factors for said fuzzy logic controller, said scaling factors including control error scaling factor, change in control error scaling factor, and change in control action scaling factor, said dynamic process characteristics for tuning a proportional integral derivative controller including critical gain and integral time constant of said process.

7. The method of claim 6, said dynamic process characteristics for tuning a proportional integral derivative controller and said fuzzy control parameters being related by the equations:

$$K_c = \frac{S_{\Delta u}}{S_{\Delta e} 4(1 - 0.5\alpha)}$$

$$T_i = \frac{S_e}{S_{\Delta e}} \Delta t$$

where:

$K_c$ is the critical gain of the process, $T_i$ is the integral time constant of the process, $S_{\Delta u}$ is the change in control action scaling factor, $S_{\Delta e}$ is the change in control error scaling factor, $S_e$ is the control error scaling factor, $\Delta t$ is the sampling rate of the fuzzy logic controller, and $\alpha$ is a stability margin adjustment factor.

8. The method of claim 6, said dynamic process characteristics for tuning a proportional integral derivative controller and said fuzzy control parameters being related by the equations:

$$K_c = \frac{S_{\Delta u}}{S_{\Delta e}(3 - \alpha)}$$

$$T_i = \frac{S_e}{S_{\Delta e}} \Delta t$$

where:

$K_c$ is the critical gain of the process, $T_i$ is the integral time constant of the process, $S_{\Delta u}$ is the change in control action scaling factor, $S_{\Delta e}$ is the change in control error scaling factor, $S_e$ is the control error scaling factor, $\Delta t$ is the sampling rate of the fuzzy logic controller, and $\alpha$ is a stability margin adjustment factor.

9. An automatically tunable control system, comprising:

a fuzzy logic controller having tunable fuzzy control parameters and being adapted for controlling a process; and a tuning module for determining dynamic process characteristics of said process for tuning a proportional integral derivative controller, for calculating fuzzy control parameters for said fuzzy logic controller as functions of said dynamic process characteristics, and for tuning said fuzzy logic controller using said fuzzy control parameters, said tuning module comprising:

a controllable signal generator selectively connectable to said system for causing said system to undergo induced oscillation; and a tuner for selectively connecting said controllable signal generator to said system, for determining said dynamic process characteristics during induced oscillation, and for calculating said tunable fuzzy control parameters as functions of said dynamic process characteristics.

10. The automatically tunable control system as recited in claim 9, further comprising a switch for alternately connecting said controllable signal generator and said fuzzy logic controller to said system.

11. The automatically tunable control system as recited in claim 9, further comprising a switch for alternately connecting and disconnecting said controllable signal generator to and from said system to selectively inject an excitation signal into said system.

12. An automatically tunable control system, comprising:

a fuzzy logic controller having tunable fuzzy control parameters and being adapted for controlling a process; and a tuning module for determining dynamic process characteristics of said process for tuning a proportional integral derivative controller, for calculating fuzzy control parameters for said fuzzy logic controller as functions of said dynamic process characteristics, and for tuning said fuzzy logic controller using said fuzzy control parameters, said tuning module comprising a model matching tuner.

* * * * *

UNITED STATES PATENT AND TRADEMARK OFFICE
CERTIFICATE OF CORRECTION

PATENT NO. : 6,330,484 B1
DATED : December 11, 2001
INVENTOR(S) : Qin

It is certified that error appears in the above-identified patent and that said Letters Patent is hereby corrected as shown below:

<u>Title page,</u>
Item [57], please delete "determined" and insert -- determine -- therefor.

Signed and Sealed this

Seventh Day of May, 2002

Attest:

Attesting Officer

JAMES E. ROGAN
*Director of the United States Patent and Trademark Office*